(12) United States Patent
Bonnet

(10) Patent No.: US 6,543,602 B1
(45) Date of Patent: Apr. 8, 2003

(54) AUTOMATED LATERAL TRANSLATION CONVEYOR

(75) Inventor: Henri Bonnet, Atlanta, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 0 days.

(21) Appl. No.: 09/345,545

(22) Filed: Jun. 30, 1999

Related U.S. Application Data

(62) Division of application No. 08/786,247, filed on Jan. 22, 1997, now Pat. No. 5,921,378.

(51) Int. Cl.[7] ............................................. B65G 47/10
(52) U.S. Cl. .............................. 198/370.03; 195/370.1; 195/370.02
(58) Field of Search ....................... 198/370.02, 370.03, 198/370.07, 370.08, 370.01

(56) References Cited

U.S. PATENT DOCUMENTS

| | | | |
|---|---|---|---|
| 1,824,858 A | 9/1931 | Williams | |
| 2,286,332 A | 6/1942 | Bleyer | |
| 2,293,121 A | 8/1942 | Dudley | |
| 2,884,118 A | 4/1959 | Williams | |
| 3,026,988 A | 3/1962 | Fisk | |
| 3,082,861 A | 3/1963 | Kornylak | |
| 3,202,266 A | 8/1965 | Schmermund | |

(List continued on next page.)

FOREIGN PATENT DOCUMENTS

| | | | |
|---|---|---|---|
| DE | 352226 | 4/1922 | |
| DE | 002940014 | * 11/1980 | ............ 198/370.08 |
| GB | 1 045 348 | 10/1966 | |
| JP | 2-221007 | 9/1990 | |
| JP | 3-95009 | 4/1991 | |
| SU | 1316954 | 6/1987 | |
| SU | 1514708 | 10/1989 | |

*Primary Examiner*—Robert P. Olszewski
*Assistant Examiner*—Steven B. McAllister
(74) *Attorney, Agent, or Firm*—Alston & Bird LLP

(57) ABSTRACT

An automated conveyor sortation and item discharge system for sorting items of varying sizes and weights to designated output destinations along a conveyor. The system utilizes a segmented slat conveyor connected by flexible connectors. The flexible connectors form a tooth for driving the conveyor by a sprocket. The flexible connectors isolate adjacent slats, and the flexible teeth isolate the slat conveyor from the drive sprocket for a enhanced reduction in noise levels. The system may utilize a conventional belt conveyor or rigid platforms attached by flexible connectors. Removable ejection mechanisms can be attached to the individual slats of the slat conveyor or to the belt of a belt conveyor. The ejection mechanisms have self-contained drive and actuation mechanisms and may operate independently of the speed of the conveyor. The drive mechanism for the ejection mechanism may be located separately from the ejection mechanism to drive the ejection mechanism when the ejection mechanism moves adjacent to a desired discharge destination. A programmable controller may be provided to control the conveyor and the discharge of items from the conveyor by the ejection mechanisms. The system is easy to repair and operates at high speeds at reduced noise levels.

2 Claims, 13 Drawing Sheets

U.S. PATENT DOCUMENTS

| | | | |
|---|---|---|---|
| 3,262,549 A | 7/1966 | Stewart et al. | |
| 3,262,550 A | 7/1966 | Kampfer | |
| 3,348,678 A | 10/1967 | Flowers | |
| 3,349,893 A | 10/1967 | Jordan et al. | |
| 3,471,012 A | * 10/1969 | Calhoun | 198/370.08 |
| 3,481,807 A | 12/1969 | Kanamori | |
| 3,511,357 A | 5/1970 | Vanderhoof | |
| 3,756,380 A | 9/1973 | Ackroyd et al. | |
| 3,776,349 A | 12/1973 | Kampfer | |
| 3,777,877 A | 12/1973 | Piper | |
| 3,788,447 A | 1/1974 | Stephanoff | |
| 3,870,142 A | 3/1975 | Woltjen | |
| 3,904,028 A | 9/1975 | Muller | |
| 3,976,192 A | 8/1976 | Muller | |
| 4,078,654 A | 3/1978 | Sarovich | |
| 4,084,687 A | 4/1978 | Lapeyre | |
| 4,128,163 A | * 12/1978 | Rana et al. | |
| 4,170,281 A | 10/1979 | Lapeyre | |
| 4,185,737 A | 1/1980 | Blattermann | |
| 4,227,610 A | 10/1980 | Gerdes et al. | |
| 4,295,559 A | 10/1981 | Neal et al. | |
| 4,441,604 A | * 4/1984 | Schlig et al. | 198/370.08 |
| 4,537,658 A | 8/1985 | Albert | |
| 4,682,686 A | 7/1987 | Ueda et al. | |
| 4,712,965 A | 12/1987 | Canziani | |
| 4,732,260 A | 3/1988 | Canziani | |
| 4,776,454 A | 10/1988 | Momose | |
| 4,875,573 A | 10/1989 | Wiseman | |
| 4,911,281 A | * 3/1990 | Jenkner | 198/370.03 |
| 4,963,251 A | * 10/1990 | Bohm et al. | 198/370.03 |
| 5,029,692 A | * 7/1991 | Warkentin | 198/370.02 |
| 5,127,510 A | 7/1992 | Cotter et al. | |
| 5,176,247 A | 1/1993 | Counter et al. | |
| 5,388,681 A | 2/1995 | Bonnet | |
| 5,421,446 A | 6/1995 | Koch et al. | |
| 5,433,311 A | 7/1995 | Bonnet | |
| 5,456,349 A | 10/1995 | Axmann | |
| 5,509,526 A | 4/1996 | Bonnet | |
| 5,826,695 A | * 10/1998 | Van Den Goor | 198/370.02 |

\* cited by examiner

AUTOMATED LATERAL TRANSLATION CONVEYOR

CROSS-REFERENCE TO RELATED APPLICATIONS

The present application is a divisional of and claims the full benefit and priority to prior application Ser. No. 08/786,247, filed Jan. 22, 1997, now issued as U.S. Pat. No. 5,921,378.

FIELD OF THE INVENTION

This invention relates to automated sorting of items such as packages to a variety of output destinations, and more particularly relates to a system utilizing parcel ejection mechanisms to discharge items from a slat or belt conveyor onto designated output chutes, bins or subsequent conveyors under programmed or manual control.

BACKGROUND OF THE INVENTION

In modern high volume package delivery systems, a variety of material handling systems are often used. Such material handling systems often include package conveying systems that divert packages placed thereon to a variety of output destinations such as chutes, bins, and subsequent conveyor systems. Systems for diverting objects from a moving conveyor have been available for many years. Such systems are useful in discharging objects from a conveying surface at selected stations located along the path of the conveying surface.

Typical package diverting systems utilize a pusher element mounted relative to a conveying surface which when actuated ejects an adjacently placed package laterally across the conveyor surface to the desired discharge station. Many such systems guide the pusher element laterally across the conveying surface using a complex series of guide tracks or cams mounted beneath the conveying surface. Such systems are noisy and relatively difficult to repair. Additionally, the speed with which such systems eject parcels from the conveying surface is typically related to and restricted by the speed of the conveying surface.

The amount of "down time" a conveying system or sorting system is shut down for repairs and/or maintenance significantly impacts operating efficiency. Thus, reliability and ease of repair are major requirements. Reliability can be increased and down time reduced by constructing package conveying and sorting systems where mechanical assemblies may be quickly and easily removed and replaced without the use of tools. Such construction may be accomplished by use of detachable mechanical assemblies such as package diverters or by mounting mechanical assemblies on modular conveying systems such that the failed mechanical assemblies or the conveyor sections housing the failed assemblies may be quickly removed and replaced. Furthermore, because of the increased speeds required of modern package handling systems, reduction of noise levels is also a major requirement.

In U.S. Pat. No. 4,170,281 to Lapeyre, a modular conveyor belt is provided from extruded flexible links which may be either plastic or metal having ends joinable into an endless belt by an extruded substantially rigid joining member.

In U.S. Pat. No. 3,349,893 to Jordan, a segmented conveyor belt is disclosed having rigid plate sections that are joined together by flexible arch joining members. The joining members include marginal beads that are inserted into retainer grooves formed into the plates transverse to the direction of travel of the conveyor belt. Adjoining members are made of elastic, flexible materials such as rubber.

The modular diverter shoe and slat construction disclosed in U.S. Pat. No. 5,127,510 to Cotter describes a modular diverter shoe for use in a slat conveyor. A diverter shoe is mounted to each slat so that the shoe may glide across the slat. The movement of the diverter shoe is affected by a guide pin and coaxial bearing which engages a network of guide tracks located beneath the conveying surface. When a package is to be diverted, a diverting switch is actuated to switch the guide pins for the diverter shoe adjacent to the package onto a diagonal track, which causes the diverter shoe to move across the slat and eject the package.

Another apparatus for sorting objects is disclosed in U.S. Pat. No. 4,732,260 to Canziani. In that system, a conveyor belt is described in which each conveyor element has a slit. The pusher elements are slidably inserted into the slits and each pusher element is connected to a drive element that extends beneath the conveyor surface. The drive element is attached to rollers and interacts with a series of cams or guide rails located beneath the conveyor. The cams include an electro-pneumatic two-position end portion. In one position, the cam engages the drive element rollers and slides the pusher element. In a second position, the rollers do not engage the guide rails.

In some of the systems noted above, pusher elements are guided across an underlying conveying surface by interacting with a series of cams, guide rails or guide tracks located beneath the conveyor surface. It would appear that the action of the moving pusher element against some of the underlying cams, guide rails and guide tracks would be a source of wear and noise. Upon failure of the underlying cams or guide components, it would appear that some of those prior art systems could undergo time consuming repair with resulting downtime for the conveying system.

Other problems associated with prior sorting systems could include the inability to eject objects from the moving conveying system at ejection speeds which are independent of the speed of the moving conveyor system. Other limitations in the prior art include limitations on the ability to eject a wide range of sizes and shapes of packages and the ability to manipulate the positioning of the object on the conveying surface prior to ejection.

As may be seen from the foregoing, prior sorting systems tend to be complex and require significant maintenance upon failure. Moreover, because such systems employ the interaction of rollers, cams and guide rails, such systems would appear to be noisy. Therefore, there has been a need in the art for a sorting system that is simple in construction, which can be easily maintained by removal and replacement of modular sortation assemblies, or conveyor sections housing sortation assemblies, without the use of tools, and which can sort and manipulate a wide range of objects at varying speeds and at relatively low noise levels.

SUMMARY OF THE INVENTION

The present invention provides an improved conveyor sorting system which is simple in construction and may be easily maintained by the quick removal and substitution of failed components and/or by the quick removal of conveyor sections housing failed components. The present invention provides an improved system for efficiently discharging items of varying sizes and weights from a conveying surfaces. The present invention decreases noise levels by employing flexible connectors between sections of a segmented conveyor and by isolating the segmented conveyor from drive and support sprockets or drive and support drums by driving the segmented conveyor with flexible teeth formed from the flexible connectors. These features individually and in combination are aspects of the present invention.

Generally described, the present invention provides a conveyor apparatus defining a plurality of supporting surfaces for conveying a plurality of packages placed thereon, the apparatus comprising a frame, a plurality of substantially rigid platform members disposed end to end in spaced apart relation and mounted for movement relative to the frame along a continuous path, each of the plurality of substantially rigid platform members defining at least one of the supporting surfaces in a substantially planar configuration, a plurality of flexible connectors alternating between and connecting the platform members, the flexible connectors each including two platform engaging portions for engaging adjacent platform members and also including a driven portion, and drive means including flexible connector engagement means for engaging the driven portion of the flexible connectors such that the platform members are driven along the path at least partially under the power of the drive means.

The present invention also provides a conveyor apparatus defining a plurality of supporting surfaces for conveying a plurality of packages placed thereon, the apparatus comprising a frame, a plurality of substantially rigid platform members disposed end to end in spaced apart relation and mounted for movement relative to the frame along a continuous path, each of the plurality of substantially rigid platform members defining at least one of the supporting surfaces such that it is substantially planar, a plurality of flexible connectors alternating between and connecting the platform members, the flexible connectors each including two platform engaging portions for engaging adjacent platform members and also including a driven portion, and drive means including flexible connector engagement means for engaging the driven portion of the flexible connectors while being isolated from contact with the platform members, such that the platform members are driven along the path at least partially under the power of the drive means.

The present invention also provides a conveyor apparatus defining at least one package supporting surface for conveying a package placed thereon from a first to a second location, the apparatus comprising a stationary frame, a package conveying portion (which can be part of a flexible belt or part or all of a rigid platform) movable relative to the frame for defining the supporting surface and including a moving support member, a pusher member for pushing the packages from the supporting surface, force transfer means intermediate the pusher member and the moving support member for transferring force from the moving force transfer means to the pusher member, such that the package may be transferred from the supporting surface.

The present invention also provides a conveyor apparatus defining at least one package supporting surface for conveying a package placed thereon from a first to a second location, the apparatus comprising a stationary frame, a package conveying portion movable relative to the frame for defining the supporting surface, a pusher member for pushing the package across the supporting surface, an electric motor attached relative to the package conveying portion for providing energy to urge the pusher member such that it pushes the package across and off of the supporting surface.

The present invention also provides a conveyor apparatus defining at least one package supporting surface for conveying a package placed thereon from a first to a second location, the apparatus comprising a stationary frame, a package conveying portion movable along an endless path relative to the frame for defining the supporting surface, a pusher member for pushing a package from the supporting surface, force transfer means for urging the pusher member across the supporting surface, an electric motor attached relative to the frame, the electric motor including at least one movable electrical lead movable with the motor; and at least one stationary electrical connection attached relative to the frame, the movable electrical connection and the stationary electrical connection being configured for relative sliding contact so as to provide electrical power to the electrical motor while the package conveying portion is in motion along the endless path.

Therefore, it is an object of the present invention to provide an improved automated conveyor sorting system.

It is a further object of the present invention to provide an improved conveyor which may be easily dismantled for repair and maintenance.

It is a further object of the present invention to provide a conveyor which operates at reduced noise levels.

It is a further object of the present invention to provide an improved ejection mechanism for ejecting items from a conveying surface.

It is a further object of the present invention to provide an ejection mechanism for ejecting items from a conveying surface which may be removed from the conveying surface quickly and easily.

It is a further object of the present invention to provide an improved apparatus for conveying and sorting items that can be repaired by quickly removing failed sub-assemblies.

Other objects, features, and advantages of the present invention will become apparent upon review of the following description of preferred embodiments and the appended drawings and claims.

DETAILED DESCRIPTION

Figure 1:
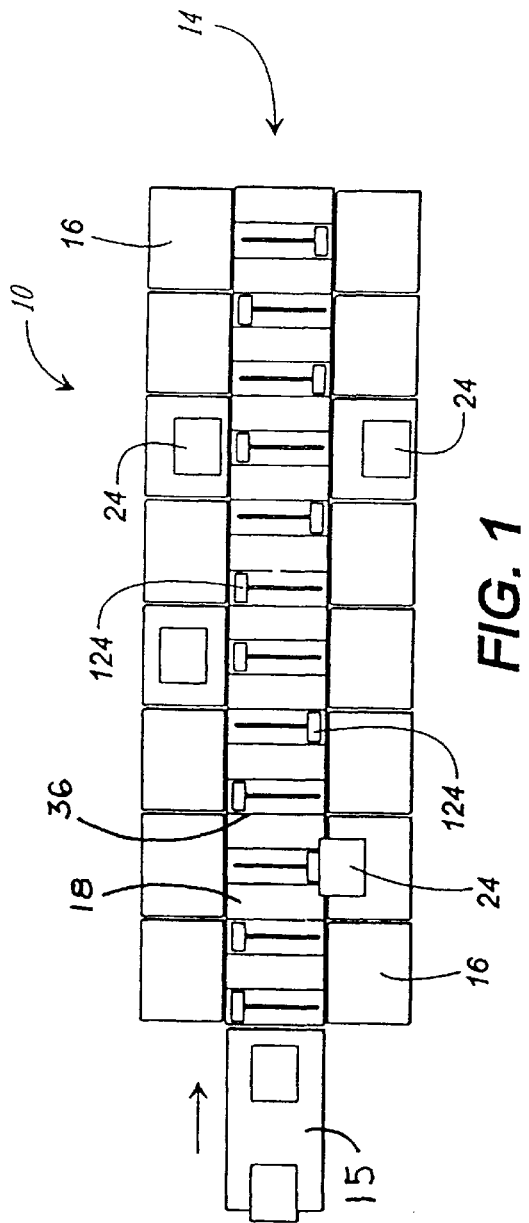
FIG. 1 is a top plan view of an automated sorting conveyor 10 embodying the present invention.
Figure 2:
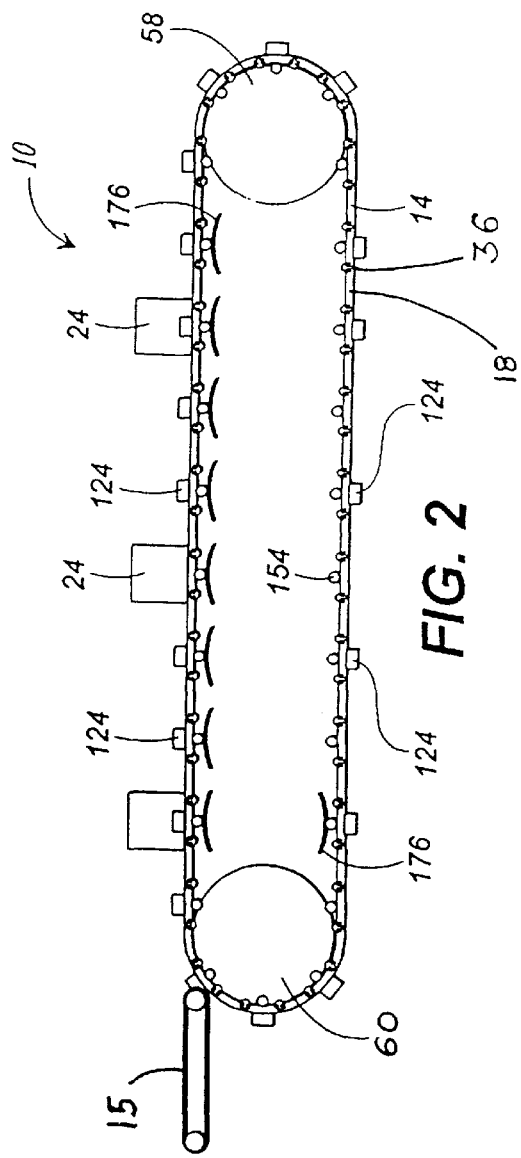
FIG. 2 is a side diagrammatic view of an automated sorting conveyor 10.

Referring now in more detail to the drawings, in which like numerals refer to like parts throughout the several drawings, FIG. 1 shows an automated conveying and sorting system 10 embodying the present invention, hereinafter described as "conveyor system" 10. With reference to FIGS. 1 and 2, the conveyor system 10 includes an endless segmented "belt" 14 comprised of a plurality of platforms or "slats" 18 connected by intermediate flexible connectors 36. In the form shown in FIG. 1 and 2, the segmented conveyor belt 14 forms a closed loop. Thus, the slat conveyor 14 may be driven by a drive sprocket 58 and idler sprocket 60, to be described in detail below.

As shown in FIGS. 1, 2, 8 and 12, each slat 18 may include an ejection mechanism 124 to eject items such as parcels (a.k.a. "packages") 24 off the slat conveyor 14 onto a variety of output destinations such as a receiving chute 16, a parallel conveyor (not shown), or a non-parallel conveyor (not shown). The parcels 24 may be loaded onto the slat conveyor 14 manually or by an induction conveyor 15. The ejection mechanism 124 discharges the parcels 24 to the desired destination, in a manner described below.

Figure 11:
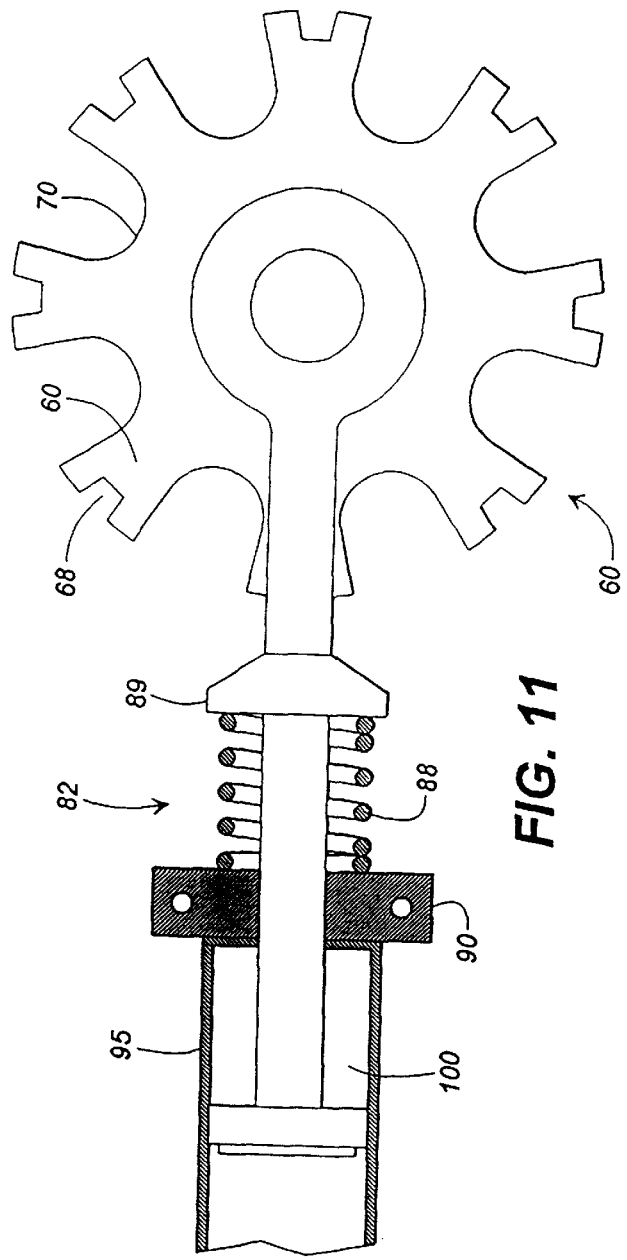
FIG. 11 is a side diagrammatic view of a tension sprocket and tension mechanism.
Figure 13:
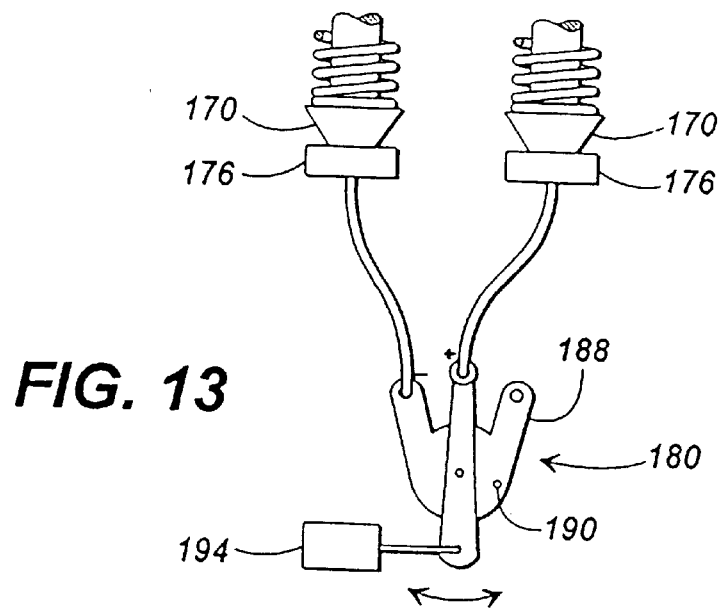
FIG. 13 is a diagrammatic view of a polarity reverser showing electrical leads and contacts.

Other subassemblies of the sorting system include a polarity reverser 180, shown in FIG. 13, which allows the ejection mechanisms 124 to eject items to the left or to the right of the slat conveyor 14 as directed by a programmable logic controller (PLC) (not shown). An idler (a.k.a. "tensioning" sprocket 60, shown in FIGS. 2 and 11, provides necessary tension in the slat conveyor 14. The assemblies and subassemblies thus far noted and shown will now be described in detail.

Figure 3:
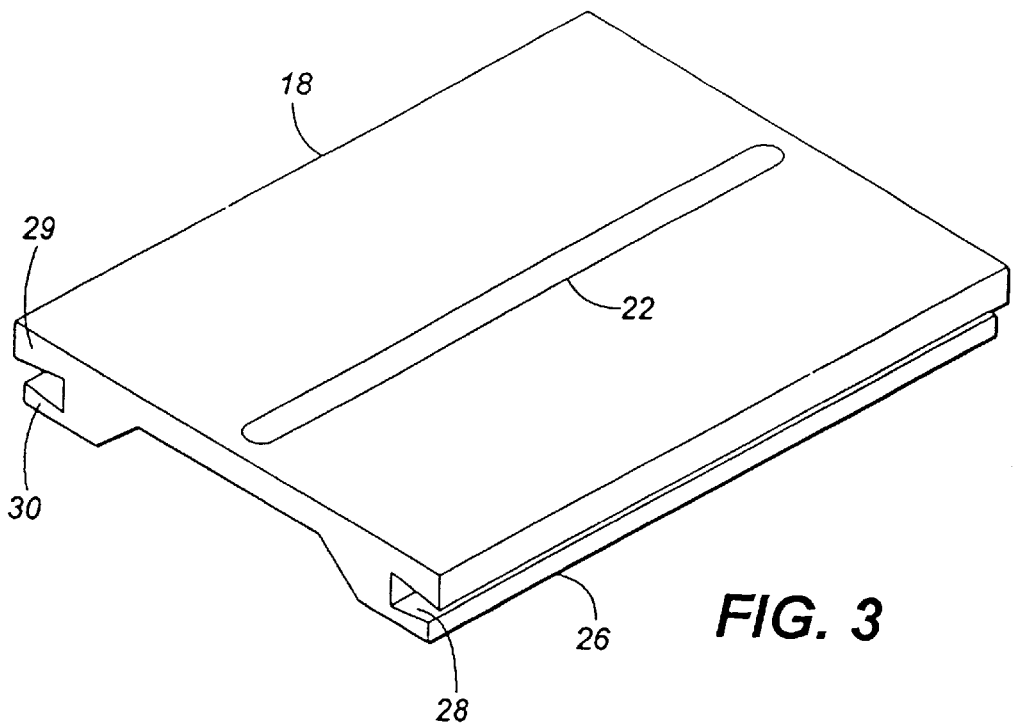
FIG. 3 is an isolated pictorial view of a platform, or "slat" of the sorting conveyor of FIG. 1.

Referring now to FIGS. 1, 2, 3, 4 and 5, the endless slat conveyor 14 is comprised of a plurality of slats 18 (a.k.a. "platforms"). In the preferred form shown, the slats 18 are formed from extruded aluminum. It is understood that the slats 18 may be formed from other suitable materials such as plastic or steel. Although other configurations are contemplated, as shown in FIG. 3, each slat 18 includes an elongate pusher member slot 22 extending along the length of the slat 18 transverse to the direction of travel of the conveyor, as shown in FIGS. 1 and 2. As will be described below, the elongate pusher member slot 22 is included in slat 18 for the placement and operation of ejection mechanism 124. It should be understood that the slat 18 may be constructed without the pusher member slot 22 where the slat 18 will not house an ejection mechanism 124.

Figure 5:
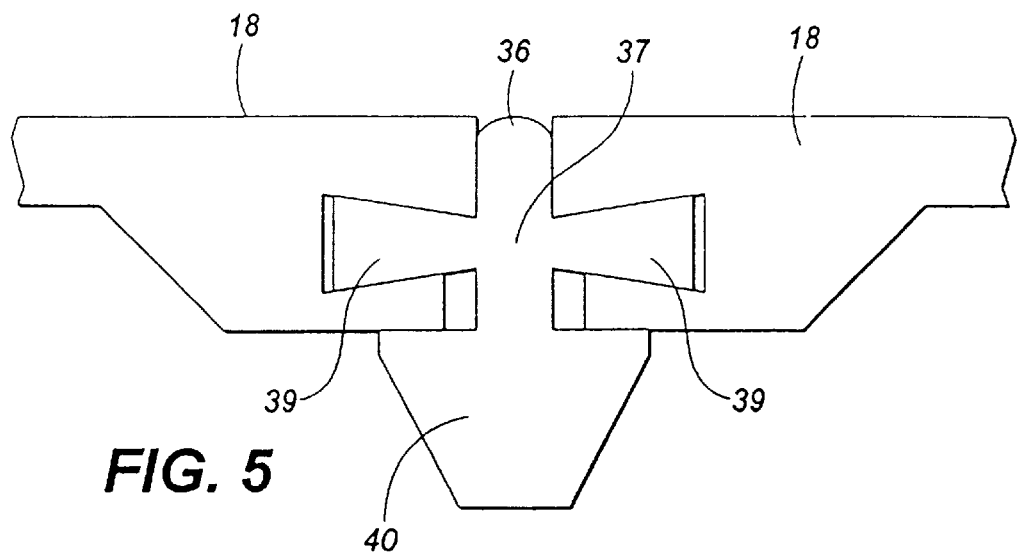
FIG. 5 is a side elevation view of the joint between two adjacent platforms connected by the flexible connector of FIG. 4.
Figure 8:
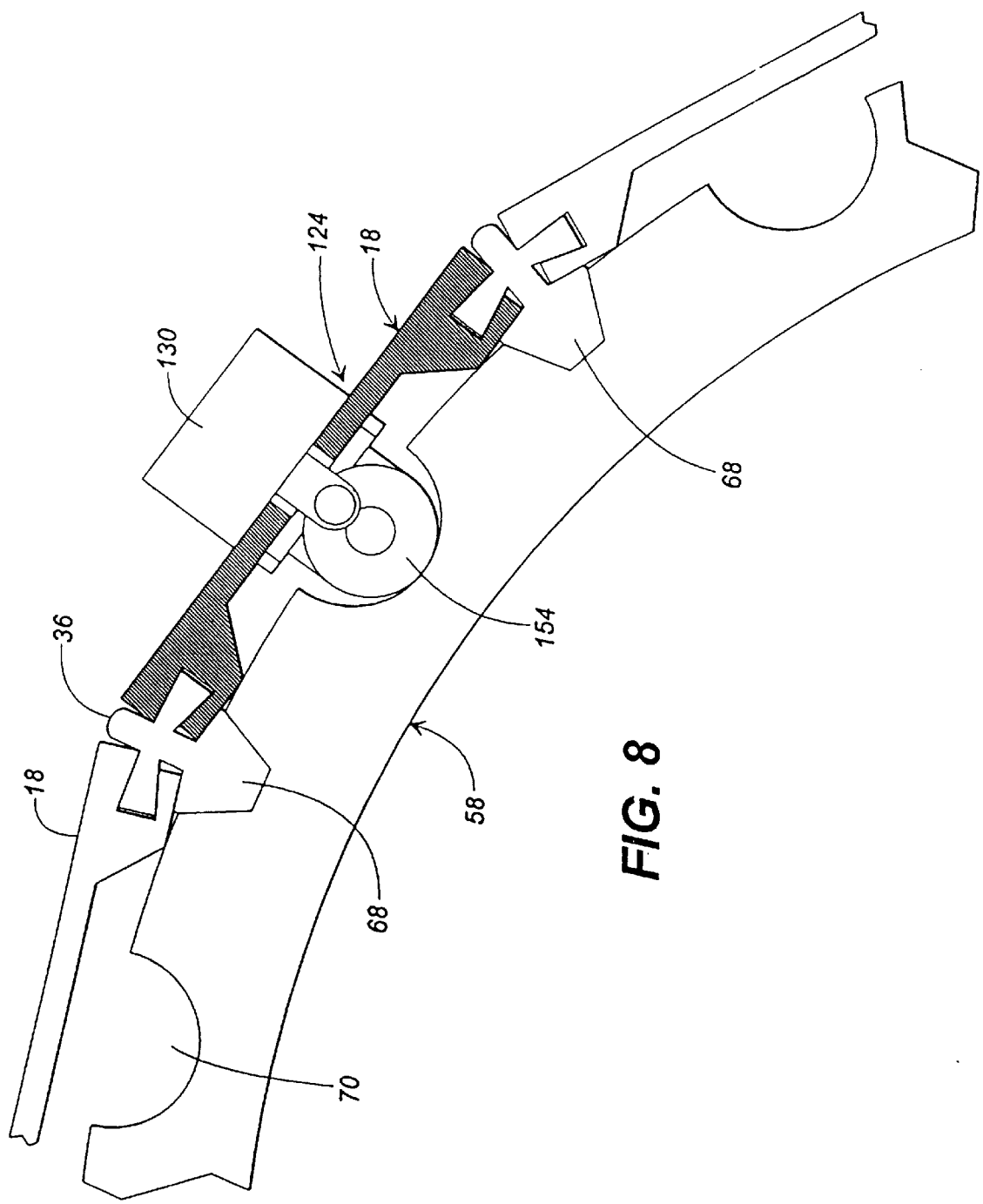
FIG. 8 is a cut away side view of a sprocket supporting a slat conveyor.

As shown in FIG. 3, the leading and trailing edges of each slat 18 can include elongate connector slots 28 formed along the length of the slat 18 transverse to the direction of travel of the slat conveyor 14. As shown in FIGS. 3 and 5, the elongate connector slots 28 are comprised of an upper member 29 and a lower member 30, which combine to retain a flexible connector as discussed below. As can be seen in FIGS. 3 and 5, lower member 30 is inwardly offset from upper member 29 to provide some clearance for flexing and bending about flexible connector 36 and relative to adjacent slats 18, as shown in FIG. 8.

Figure 4:
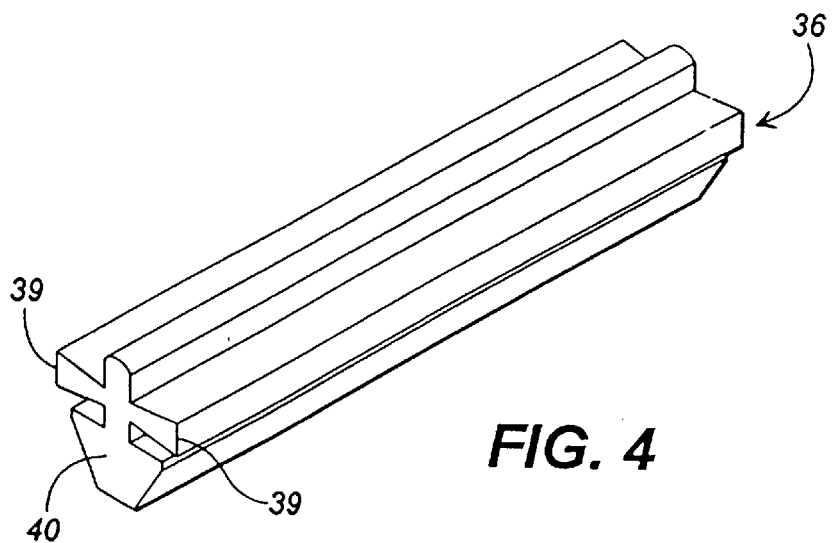
FIG. 4 is a pictorial view of a flexible connector for connecting the platform of FIG. 3 to adjacent platforms.
Figure 6:
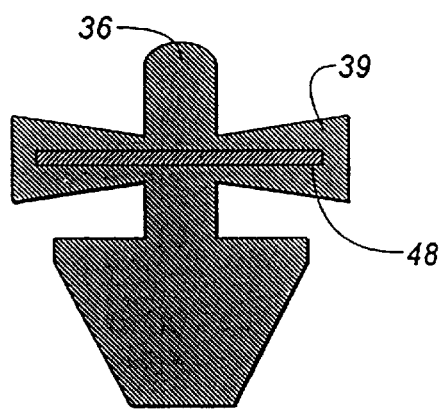
FIG. 6 is an end view of an alternate form of the flexible connector of FIG. 4 showing an internal slot.
Figure 7:
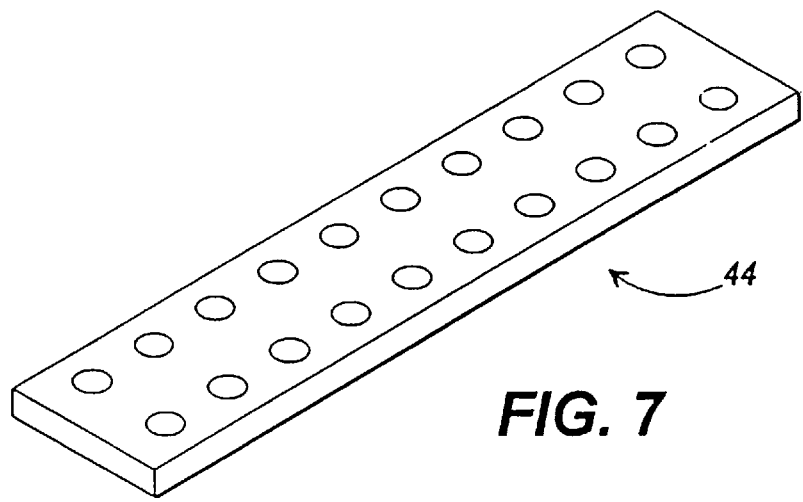
FIG. 7 is a pictorial view of a strengthening member for introduction into the slot of the flexible connector of FIG. 6.

Referring now particularly to FIGS. 4, 5 and 6, each slat 18 is connected to adjacent slats 18 by a flexible connector 36 which is inserted into the connector slots 28 of adjacent slats 18 as shown in FIG. 5. The flexible connector 36 is an elongate flexible member which runs substantially the width of the slats 18 and transverse to the direction of travel of the slat conveyor 14. The flexible connector 36 is formed from extruded rubber or plastic, but it is understood that other suitably strong materials may be utilized.

In an alternate form, as shown in FIG. 6, an elongate slot 48 may be included in flexible connector 36. An insert 44, as shown in FIG. 8, may be inserted or molded into the elongate slot 48 of flexible connector 36 to provide enhanced strength to the flexible connector 36. The insert 44 may be constructed of a suitably strong material such as Kevlar or spring steel.

As can be seen from the end view of the flexible connector 36, as shown in FIGS. 5 and 6, the flexible connector 36 can be comprised of a vertical stem 37 and a "bow tie" shaped cross member running transverse to vertical stem 37. The "bow tie" shaped cross members forms flanges 39 which slidably engage the elongate connector slots 28 of the slats 18 as shown in FIG. 5. Referring still to the end view of flexible connector 36, shown in FIG. 5, the lower terminus of the vertical stem 37 of the flexible connector 36 forms a tooth 40 for engaging complementary notches in a drive sprocket or drive drum in order to drive the slat conveyor 14, as shown in FIG. 5. Although the flanges are essentially trapezoidal in shape, it should be understood that other headed configurations are likewise contemplated. Other non-headed flanges are likewise contemplated if suitable attachment means are provided.

Referring now to FIGS. 1, 2, and 8 and 9, the conveyor belt 14, comprised of slats 18 and connected by flexible connectors 36 as described above, is connected into a closed loop and is supported by a drive sprocket 58 and an idler sprocket 60. The conveyor 14 is driven by the drive sprocket 58 by engagement of the teeth 40 (see FIGS. 4 and 5) of flexible connectors 36 with corresponding notches 68 formed on the drive sprocket 58 and the idler sprocket 60, shown in FIGS. 8 and 11. The use of flexible connectors 36 to connect the slats 18 and to drive the slat conveyor 14 via the flexible teeth 40 of the flexible connectors 36 allows for increased speed and reduction of noise by isolation of each slat from adjacent slats and by isolation of direct contact of the slat conveyor 14 from the drive sprocket 58 and the idler sprocket 60. The use of the flexible connectors 36 to connect the slats 18, as described above, also facilitates quick and easy removal and replacement of individual slats 18 for maintenance and repair. As may be understood, the slats 18 may be removed by slidably withdrawing the flexible connectors from each end of a given slat 18, and then removing the slat 18.

Figure 10:
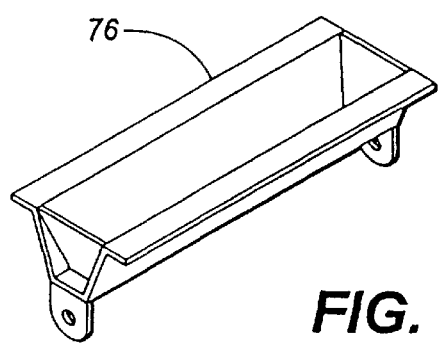
FIG. 10 is a pictorial view of an insert box for receiving teeth formed from the flexible connectors of FIG. 4.

As described above, the slat conveyor 14 is supported by the drive sprocket 58 and the tension sprocket 60, both of which include notches for receiving inwardly extending teeth 40 of each flexible connector 36. In an alternate form as shown in FIG. 10, metal insert boxes 76 may be inserted into the tooth notches 68 of drive sprocket 58 and the tension sprocket 60. Metal insert boxes 76 provide for a smooth preformed tooth notch for the teeth 40 of the flexible connectors 36. The metal insert boxes 76 may be secured to the drive sprocket 58 and the tension sprocket 60 by welding, bolting, riveting, or an other suitable attachment method. The metal insert boxes 76 may be constructed out of aluminum or other suitably strong material.

Figure 9:
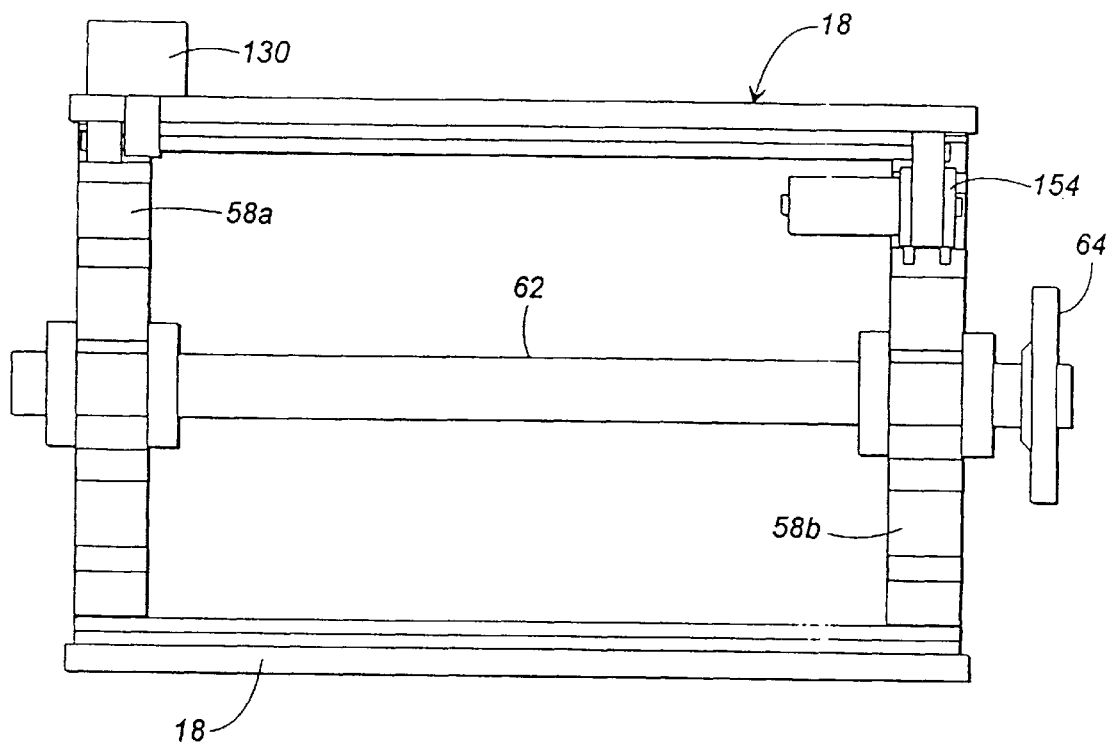
FIG. 9 is an end view of a drive sprocket assembly showing two sprockets connected by an axle.

As shown in FIG. 9, the drive sprocket 58 is comprised of sprockets 58a and 58b connected by an axle 62. In the preferred form shown in FIG. 9, the drive pulley 64 is mounted to the axle 62 outside drive sprocket 58b. The drive sprocket 58 is driven by a drive motor (not shown). As shown in FIGS. 2 and 11, the slat conveyor 14 is supported at the end opposite the drive sprocket 58 by the tension sprocket 60. The tension sprocket 60 provides necessary tension in the slat conveyor 14, and conversely, releases the tension in the slat conveyor 14 in order to remove individual slats 18 for maintenance or repair.

As shown in FIG. 11, the tension sprocket 60 includes a tension mechanism 82. The tension mechanism 82 is comprised of a compression spring 88 which is retained by forward spring retaining member 89. At the rear end of the compression spring 88 is a spring compression and release member 90. The spring compression and release member 90 is actuated by a hydraulic cylinder 95 which contains hydraulic fluid 100. As is well known to those skilled in the art, a suitable pneumatic cylinder may be used in place of hydraulic cylinder 95. Tension in the slat conveyor 14 may be decreased by manually activating the hydraulic cylinder, or operation of the tension mechanism 82 may be directed by a programmable logic controller (not shown).

Figure 12:
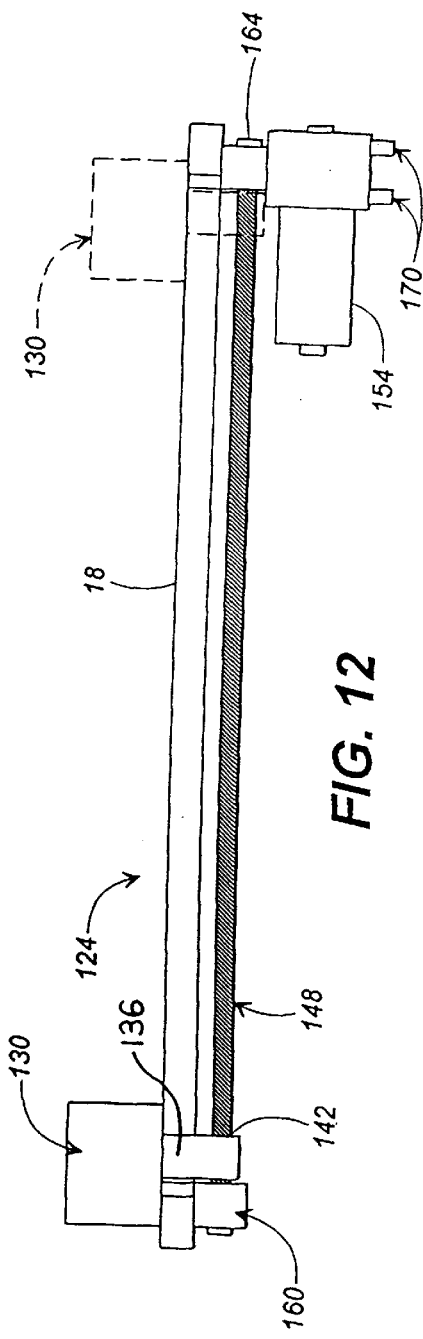
FIG. 12 is an end diagrammatic view of an ejection mechanism embodying the present invention.

Referring now to FIGS. 1, 2, 8 and 12, each slat 18 of the slat conveyor 14 can contain a built-in ejection mechanism 124. As previously described, the ejection mechanism 124 may be used to discharge items such as parcels 24 from the slat conveyor 14 to a variety of output destinations. The ejection mechanism 124, as shown in FIG. 12, includes a pusher member (a.k.a. "pusher plate") 130 for pushing items off the upwardly-directed surface of the slat conveyor 14. As shown in FIG. 8, the pusher member 130 is T-shaped and runs substantially across the length of the slat 18 transverse to the direction of travel of the slat conveyor 14.

Referring now to FIGS. 8 and 12, the lower stem of the T-shaped pusher member extends down through the pusher member slot 22. As shown in FIG. 12, beneath the slat 18, a threaded opening 142 in the pusher member stem 136 threadably engages a screw actuator (a.k.a. "lead screw") 148. The screw actuator 148 is powered by an electric gear motor 154. The screw actuator is rotatably mounted to the slat 18 at the end opposite the electric gear motor 154 by a bearing mount 160 as shown in FIG. 12. The electric gear motor 154 is mounted to the slat 18 by a gear motor mount 164. Thus, as shown in FIGS. 8 and 12, the ejection mechanism is mounted on board the individual slat 18 and travels with the slat 18 as a part of the slat conveyor 14.

Figure 14:
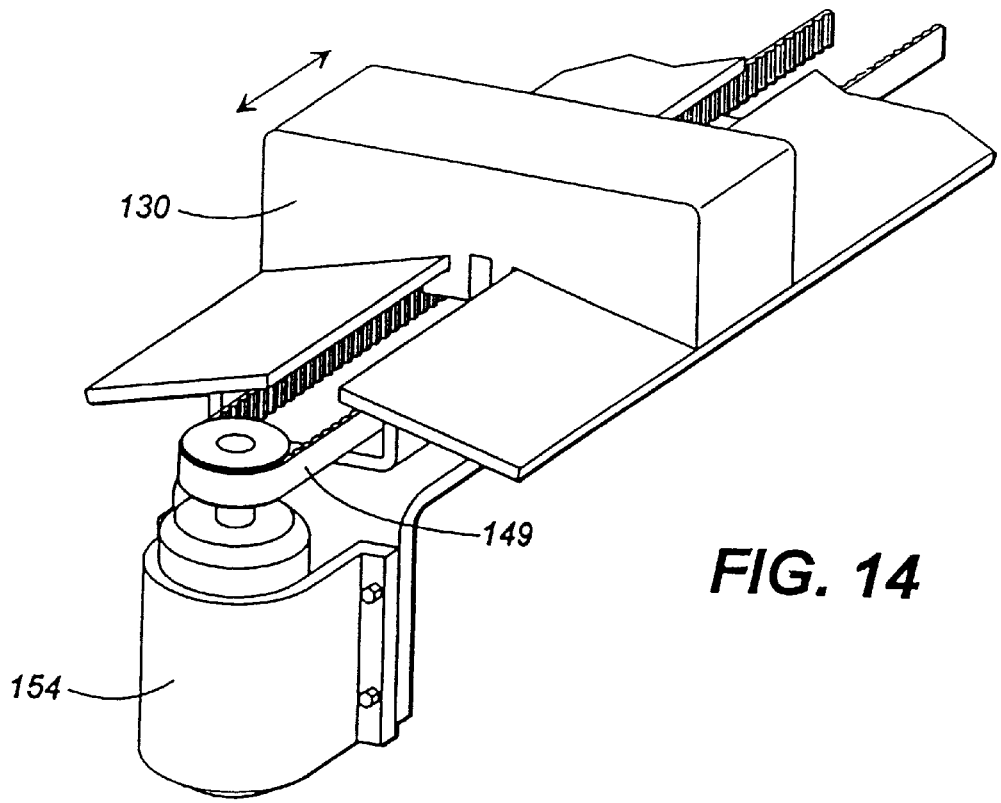
FIG. 14 is a pictorial view of a cog belt driven ejection mechanism.

As shown in FIG. 8, the drive sprocket 58 and tension sprocket 60 include gear motor notches 70 to receive the electric gear motor 154 and screw actuator 148 as the slat conveyor 14 is driven over the drive sprocket 58 and the tension sprocket 60. In an alternate form shown in FIG. 14, the pusher member 130 may be actuated by a cog belt 149 which engages a complementary set of teeth (not shown) disposed on the lower stem of the pusher member 130.

Referring now to FIGS. 2, 12, and 13, a pair of movable electrical power contacts 170 are attached to the electric motor 154. The electrical power contacts 170 extend outwardly from the ejection mechanism and engage fixed power strips 176 which are positioned adjacent to desired discharge locations. As shown in FIG. 13, electrical contacts 170 are spring loaded to provide continuous and even contact between the contacts 170 and the fixed power strips 176. Thus, energization of the electrical contacts 170 via the fixed power strips 176 energizes the electrical gear motor 154 which in turn rotates the screw actuator 148 to drive the pusher member 130 across the slat 18 at a high rate of speed.

If desired, two or more pusher members may be actuated simultaneously to eject a large or long parcel from the conveying surface. Because the ejection mechanism 130 is driven independently of the underlying conveyor, a PLC may direct the ejection mechanism 130 to eject items at varying speeds as may by desired. As is well known to those skilled in the art, the PLC may vary the speed of the ejection mechanism drive motor by positively or negatively ramping the electric current supplied to the motor.

Referring back to FIG. 13, positioned between the fixed power strips 176 and the gear motor power source (not shown) is a polarity reverser 180. As shown in FIG. 13, the polarity reverser 180 includes a pair of fixed contacts 170 which engage moveable contacts 188 mounted on the switch 190. An electric solenoid 194 is connected to the switch 190, which at the direction of the programmable logic controller may actuate the switch, and thus reverse the polarity of current flowing through fixed power strip 176 and to the electrical contacts 170, as shown in FIG. 13. By reversing the polarity to the electric gear motor 154 by the polarity reverser 180, as described, the pusher member 130 may be returned to a starting position, as shown in FIG. 12. The polarity reverser 180 also may be used to cause the pusher member 130 to discharge an item such as parcel 24 to the right or to the left of the slat conveyor 14, as desired.

A second embodiment of the present invention is shown in FIGS. 15 through 23, which portray an automated sorter system 200, which may utilize a segmented slat conveyor as described in the first embodiment or which may utilize a flat drum-driven conveyor belt. As with slat conveyor of the first embodiment, a slat conveyor or a belt conveyor may comprise a plurality of ejection mechanisms for ejecting parcels to a variety of output destinations. In contrast to the "on-board" electric generator 154 of the first embodiment, the present embodiment utilizes a "off-board" pushing member driving means, to be described below.

Figure 15:
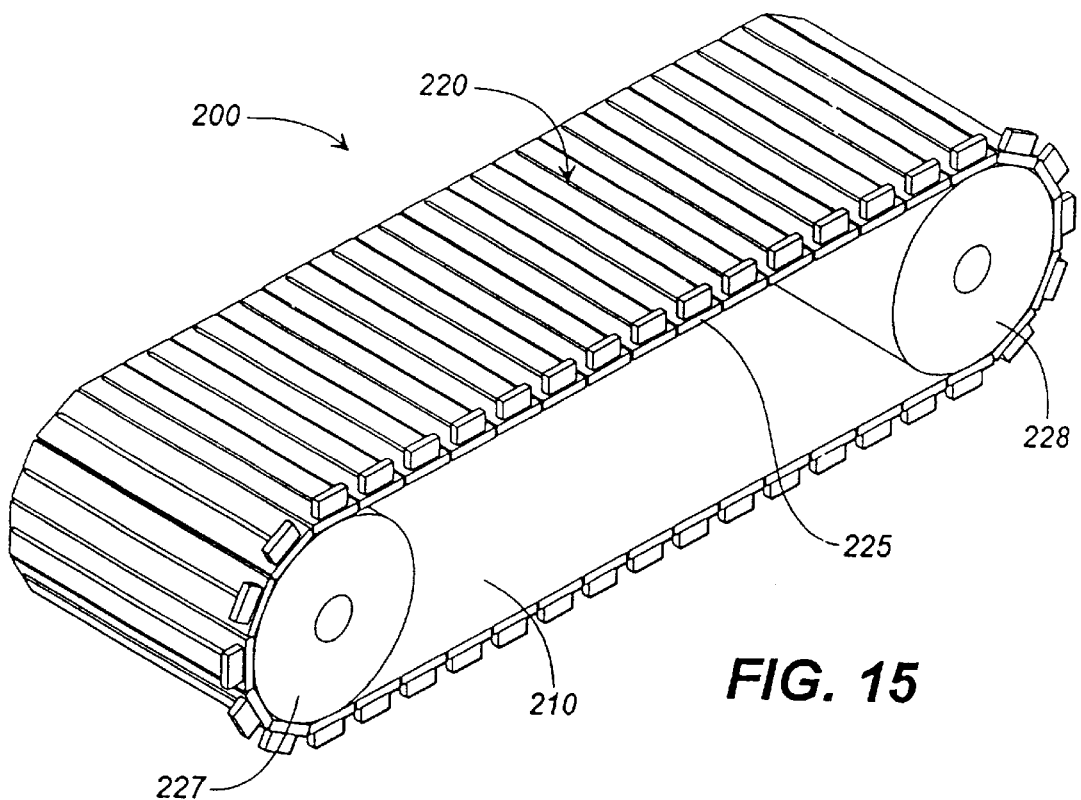
FIG. 15 is a pictorial view of a belt conveyor-embodying the present invention.
Figure 17:
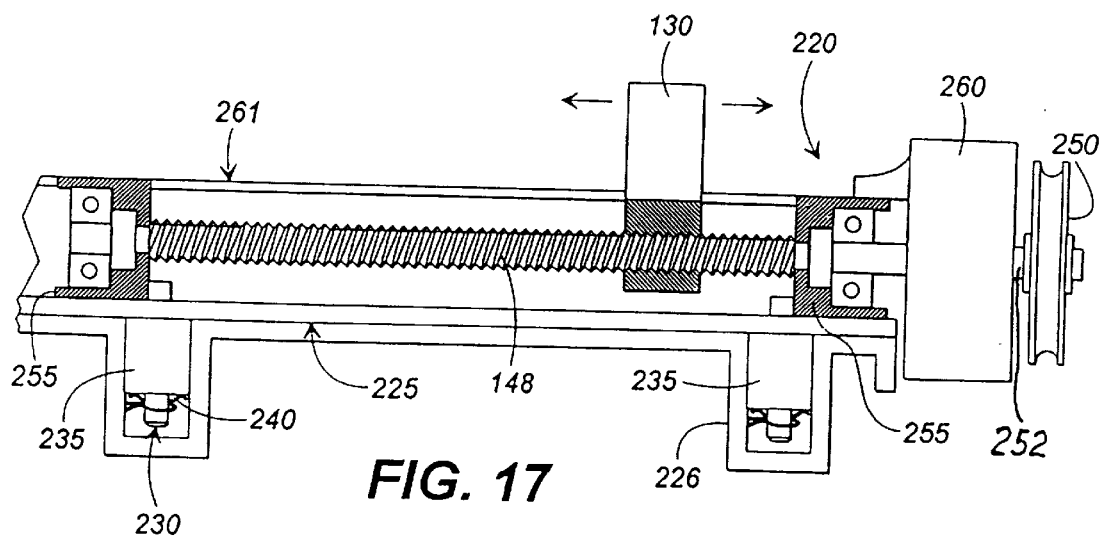
FIG. 17 is a side diagrammatic of an alternate ejection mechanism embodying the present invention.
Figure 19:
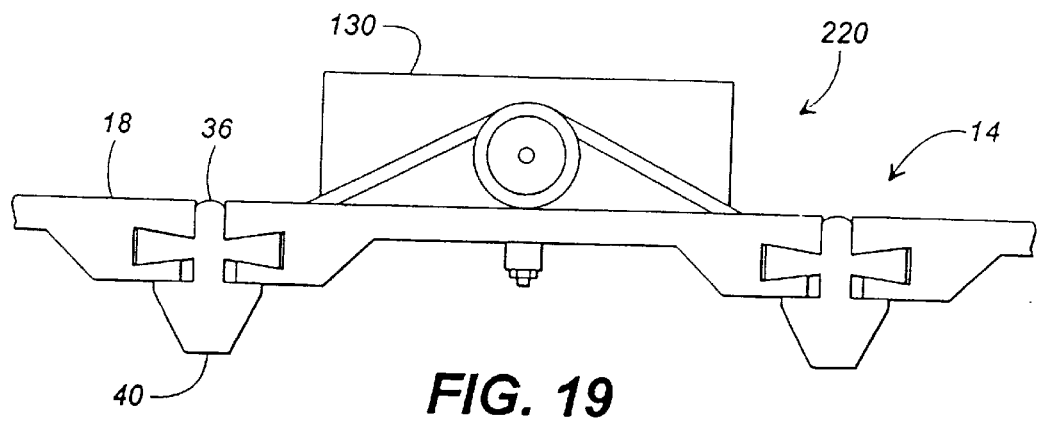
FIG. 19 is a side diagrammatic view of the ejection mechanism of FIG. 17 mounted on a slat conveyor.

As shown in FIGS. 15 and 17, the ejection mechanisms 220 are mounted on the upper surface of the conveyor belt 225. As shown in FIG. 19, the ejection mechanism of this embodiment may also be mounted on a slat conveyor 14. This configuration allows the belt conveyor 225 or slat conveyor 14 to be moved in alternate configuration, such as a serpentine configuration (not shown) without having equipment underneath the slat or conveyor to hamper movement.

Figure 18:
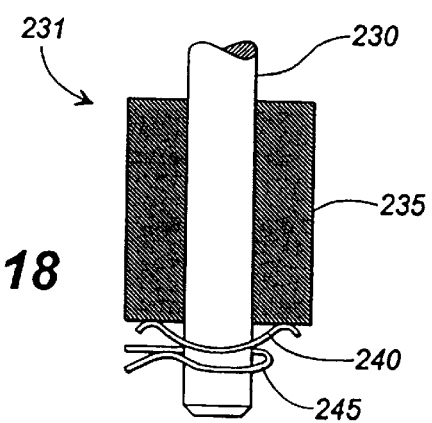
FIG. 18 is a side elevation view of a mounting assembly of the ejection mechanism of FIG. 17.

As shown in FIGS. 17 and 18, ejection mechanism 220 is attached to conveyor belt 225 by inserting mounting rods 230 through corresponding holes (not shown) in the conveyor belt 225. As shown in FIGS. 17 and 18, beneath conveyor belt 225, the mounting rods are placed through flexible inserts 235 and are retained by spring washers 240 and retaining pins 245. The flexible inserts 235 maintain snug, but flexible contact between the ejection mechanism 220 and the conveyor belt 225 or slat 18.

Figure 16:
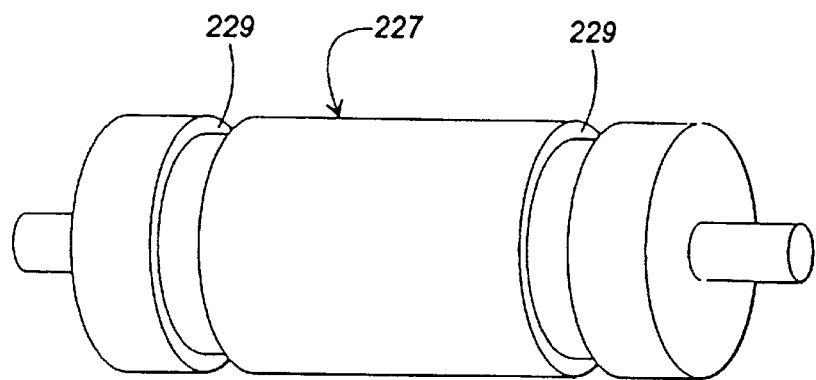
FIG. 16 is a pictorial view of a drive drum for supporting the belt conveyor of FIG. 15.

As shown in FIG. 17, a conveyor superbed 226 may be provided with pre-formed receptacles for receiving the retainer rods 230 of the ejection mechanism 220. As shown in FIGS. 15 and 16, where the second embodiment is employed using a conveyor belt 225, drive drum 227 and tail drum 228 include first and second grooves 229 to receive the mounting rod assembly 231.

Referring back to FIG. 17, the ejection mechanism 220 is comprised of a pusher member 130 actuated by a screw actuator 148. A sheave 250 is attached to a drive shaft 252 at a first end of the screw actuator 148. Bearing mounts 255 are provided at both ends of the screw actuator 148, which are attached to the mounting rods 230. As shown in FIG. 17, a coil spring retractor 260 is mounted on the drive shaft 252 between the sheave 250 and the actuator screw 148. The coil spring retractor 260 is wound as the pusher member 130 is actuated away from the sheave 250. Upon the cessation of rotation of the sheave 250 to drive the pusher member 130, the coil spring retractor unwinds to reverse the rotation of the screw actuator 148 and return the pusher member 130 to the starting position at the sheave end of the ejection mechanism 220.

Figure 20:
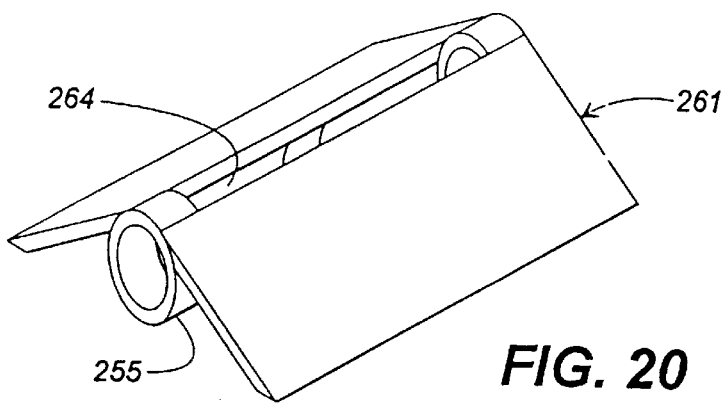
FIG. 20 is a pictorial view of a cover plate for the ejection mechanism of FIG. 17.
Figure 21:
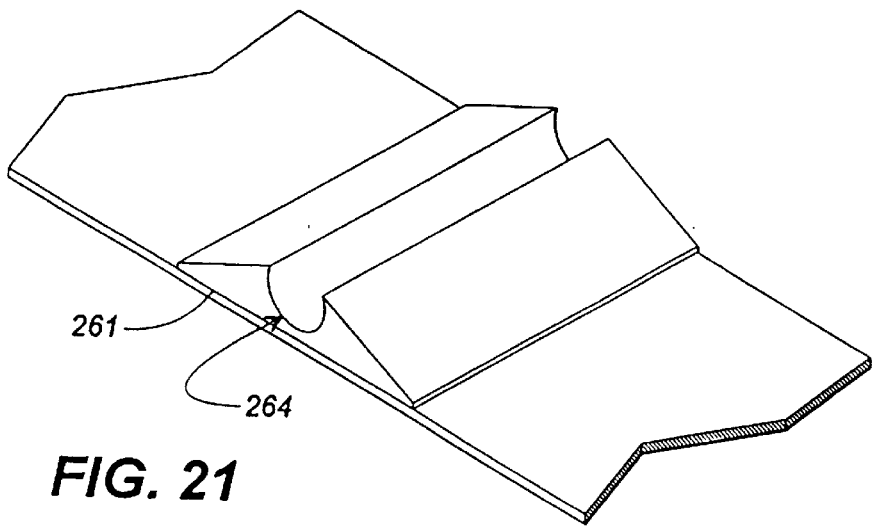
FIG. 21 is a pictorial view of an alternate cover plate for the ejection mechanism of FIG. 17.

As shown in FIGS. 17 and 20, a cover plate 261 is attached to the ejection mechanism 220 to protect the ejection mechanism 220 and to provide a smooth transitional surface between the conveyor belt 225 or slat 18 and the pusher member 130. As shown in FIG. 20, the cover plate 261 comprises first and second bearing mounts 255 and a screw actuator cavity 264 through which the screw actuator 148 is placed. As shown in FIG. 21, an alternate cover plate 261 is provided.

Figure 22:
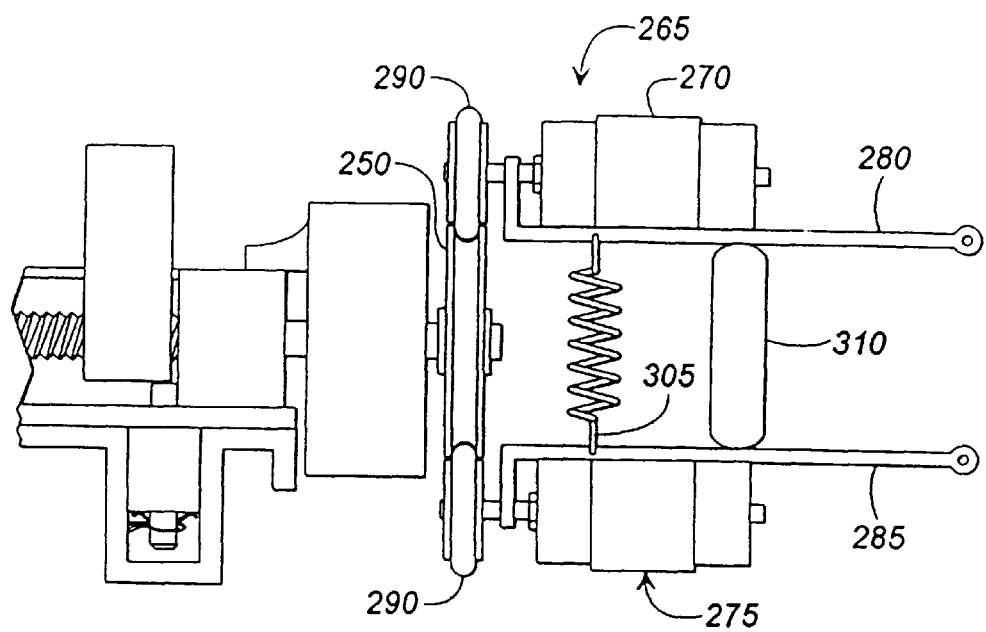
FIG. 22 is a end elevation view of an "off-board" drive assembly for driving the ejection mechanism of FIG. 17.
Figure 23:
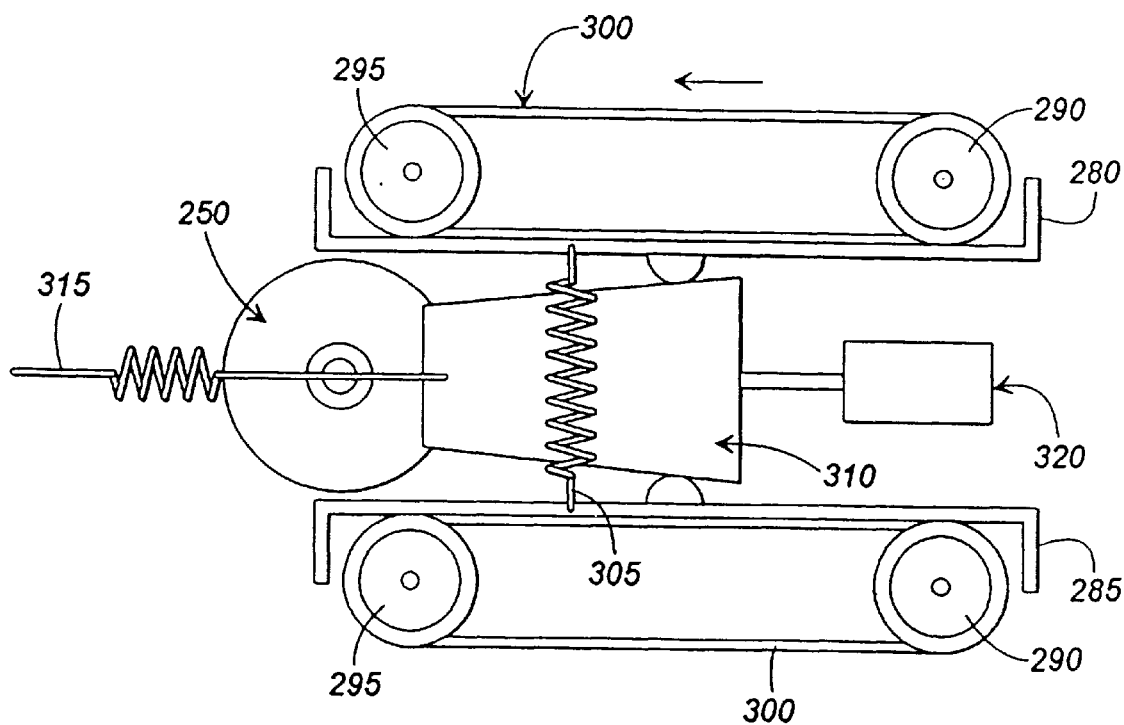
FIG. 23 is a side diagrammatic view of an "off-board" drive assembly for the ejection mechanism of FIG. 17.

Referring now to FIGS. 22 and 23, rotational force for the sheave 250 is provided by a plurality of drive assemblies 265 which are mounted externally to the conveyor at each discharge location. As shown in FIG. 22, the drive assembly 265 includes an upper drive motor 270 and a lower drive motor 275 mounted on the upper and lower mounting plates 280 and 285. As shown in FIGS. 22 and 23 each of the upper and lower drive motors 270 and 275 drive a first drive pulley 290. A support pulley 295 is mounted in spaced apart relation to drive pulley 290, as shown in FIGS. 22 and 23. Drive pulleys 290 and support pulleys 295 support upper and lower drive belts 300 as shown in FIGS. 22 and 23. The drive belts 300 are driven by drive motors 270 and 275.

Referring still to FIGS. 22 and 23, the upper and lower mounting plates 280 and 285 are pivotally mounted to a stationary support (not shown) external of and adjacent to the conveyor 210. A tension spring 305 is attached to the upper mounting plate 280 and to the lower mounting plate 285 to urge the upper and lower drive belts 300 together and onto the sheave 250 as shown in FIGS. 22 and 23 during operation of the ejection mechanism, to be described below. As shown in FIG. 23, a separator wedge 310 is operatively mounted between the upper and lower mounting plates 280 and 285 to oppose the tension spring 305 and separate the upper and lower drive belts from the sheave 250 when the ejection mechanism is not in operation. An opening spring 315 is attached to the separator wedge 310 to draw the separator wedge into the open position as shown in FIG. 23. Power to the upper and lower motors 270 and 275 is supplied by an external source (not shown) and is controlled by a PLC as described in the first embodiment. As shown in FIG. 23, the separator wedge 310 is mechanically retracted by energizing a solenoid 320 to allow the upper and lower drive belts 300 to engage the sheave 250.

Figure 24:
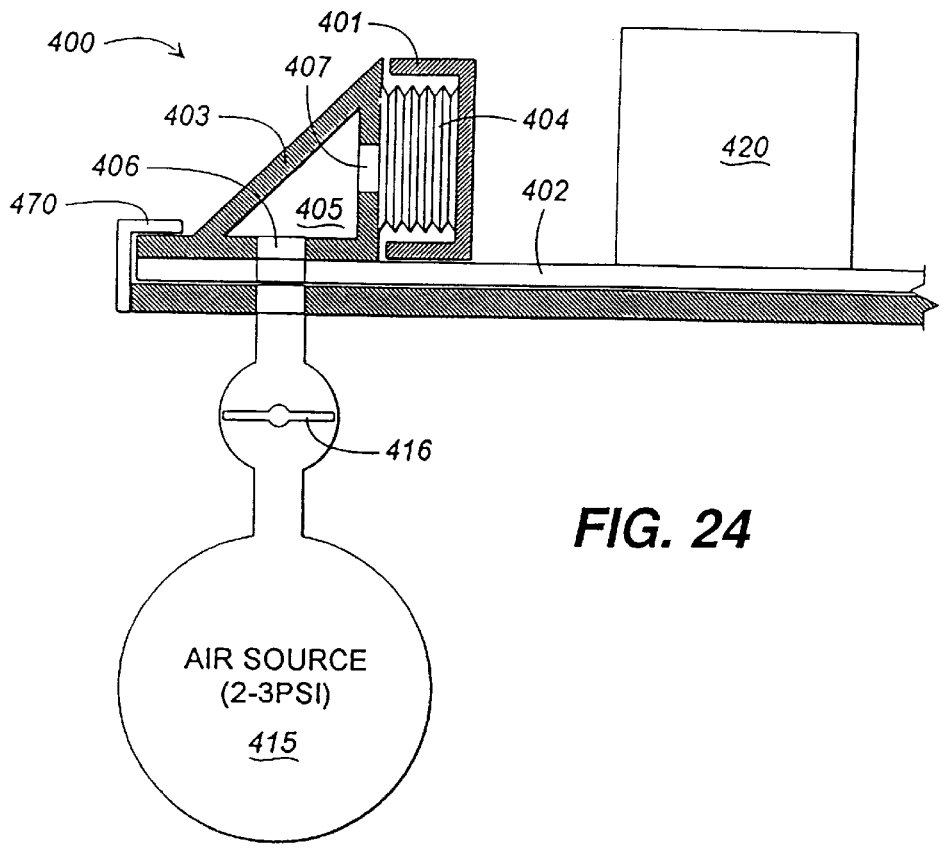
FIG. 24 is a side elevational view of a bellows-type push plate configuration in its retracted configuration.
Figure 25:
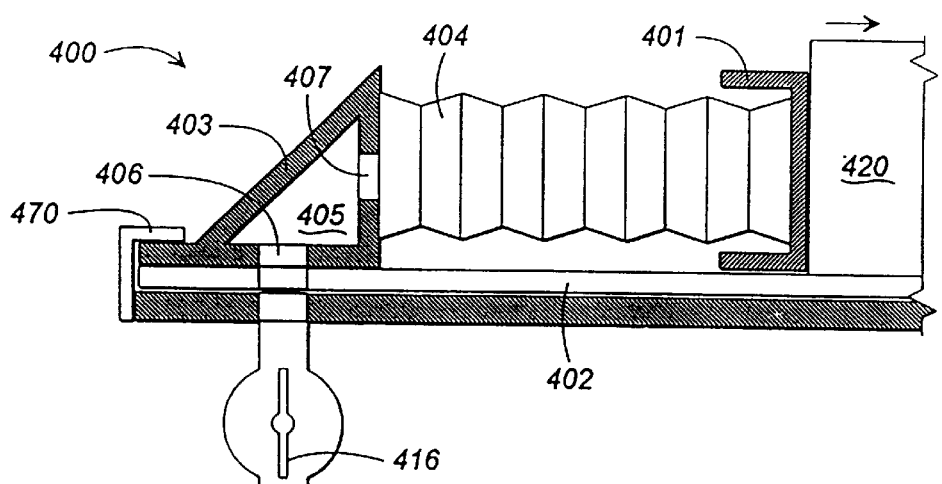
FIG. 25 is a view similar to that of FIG. 24, with the bellows shown expanded.
Figure 25:
Figure 26:
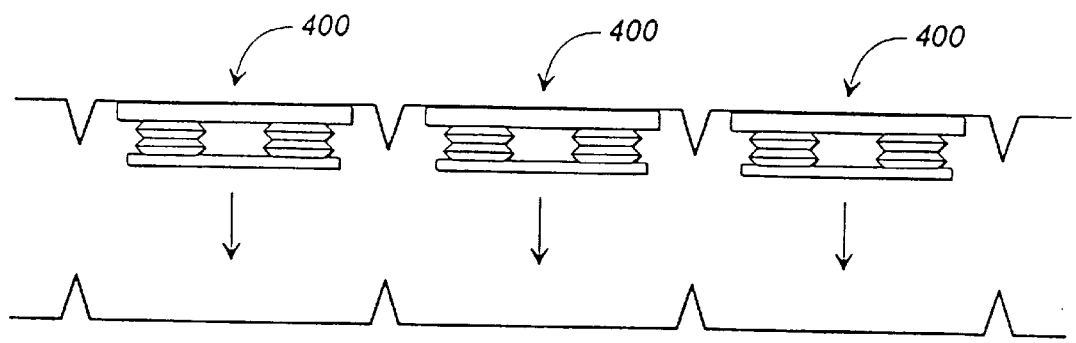
FIG. 26 is a top view of multiple dual-bellows push plate configurations 400 atop a serpentine belt with notches to allow side bending.
Figure 27:
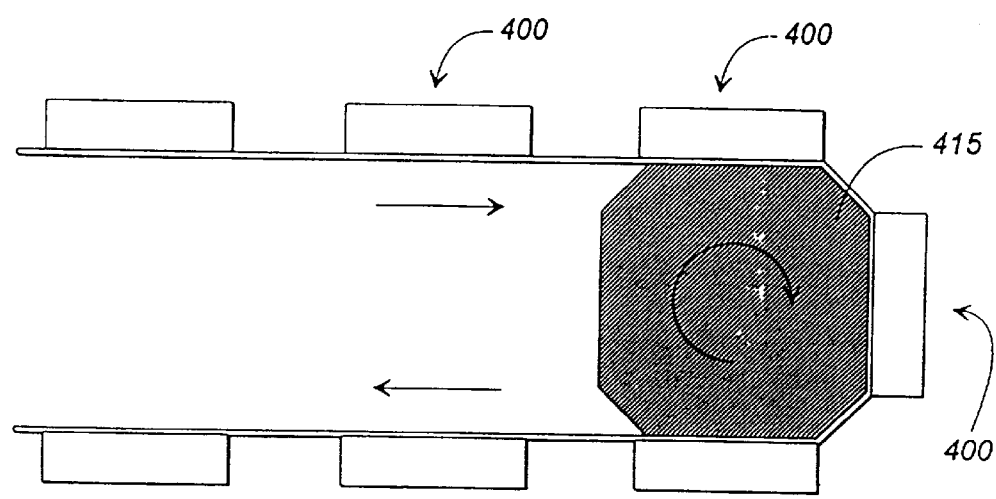
FIG. 27 is a side view of a conveying system for supporting the belt of FIG. 26 in an "over-under" configuration, although a flat "carosel"-type conveyor design is also possible with the side notches allowing for sideward bending of the conveyor belt.
Figure 28:
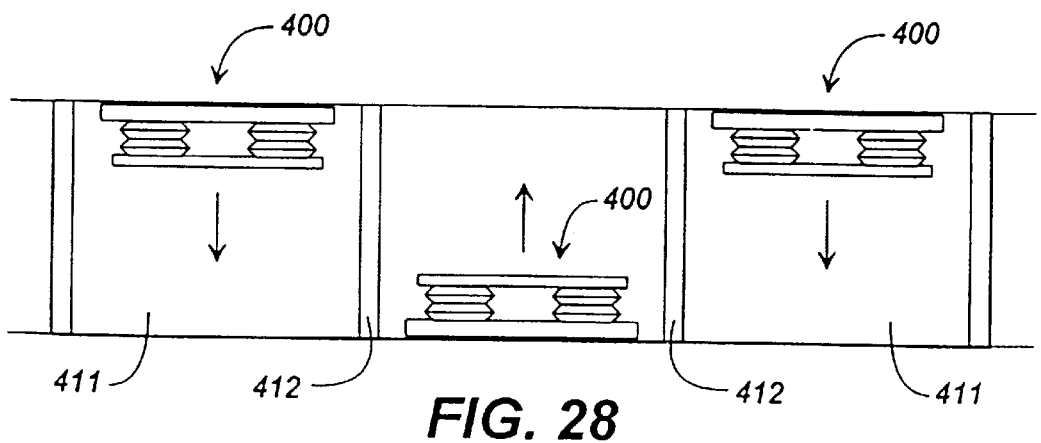
FIG. 28 is a top view of dual-bellows push plate configurations 400 atop rigid platforms connected by flexible intermediate connectors.

Referring now to FIGS. 24 and 25, a "push plate" conveying segment is shown as 400 in FIGS. 25–28. In FIGS. 24, 25 and 26, two or more horizontally-acting bellows members are attached relative to the top surface of a conveyer belt 402 to provide a pushing function to a package 420 situated atop the top surface of the conveyor belt 402, such that it is pushed off the belt. In FIG. 28, rigid platforms 411 are used to support the bellows configurations 400.

Referring now particularly to FIGS. 24 and 25, the configuration 400 includes a conveyor belt 402, a chamber housing 403, bellows members 404, and a push plate 401. The air chamber housing 403 of the push plate conveying segment 400 is attached to and moves with the upper surface of the belt 402, and is configured such that it fits under the edge restraint 470. The air chamber housing 403 defines an interior air chamber 405 which is supplied air through a chamber inlet port 406 and itself supplies air to two chamber outlet ports 407. Each of the two chamber outlet ports 407 supplies air from the chamber 405 to a corresponding one of the two horizontally-oriented members 404. In one preferred embodiment, the belt 402 is composed of flexible conveyor belt material.

The bellows members 404 operate such they extend along their lengths upon the introduction or air, such that their two ends are separated along the width of the package conveying segment 400. The bellows members 404 are side-by-side in a parallel relationship, and each has one end attached to the air chamber housing 403 and the other attached to the push plate 401. Upon the energizement of the bellows members 404 from their retracted positions shown in FIG. 24 to their extended positions shown in FIG. 25, the push plate 401 is itself pushed substantially across the width of the belt 402 of the push plate conveying segment 400. Should a package be positioned on the belt 402 beside the push plate 401, it is discharged from the belt as shown in FIG. 25 by the bellows members 404. Energizement of each bellows member is provided by opening a valve such as 416 from its position shown in FIG. 24 to its position shown in FIG. 25.

Referring back to FIG. 1, the automatic sorting system 10 can be operated under the control of a digital controller, which may be a programmable logic controller (PLC) or a general purpose microprocessor which is found in a personal computer. Methods for programming such controllers to operate a sorting system of the type disclosed therein are conventional and known to those skilled in the art.

As described in the preceding section, the slat conveyor 14 is driven by a drive sprocket 58. As previously described, motive force is applied to the slat conveyor 14 by engagement of notches in the drive sprocket 58 with the flexible teeth 40 of slat connectors 36. During operation, adequate tension is maintained in slat conveyor 14 by the tension mechanism 82 connected to tension sprocket 60. As increased tension in the slat conveyor 14 is required, the PLC will direct the actuation of the hydraulic cylinder 95 to compress the tension spring 88 and thereby apply force against tension sprocket 60 as shown as in FIG. 11. Conversely, if the slat conveyor 14 needs to be slackened in order to remove an individual slat 18 or an ejection mechanism 124, the hydraulic cylinder may be directed manually or by the PLC to release the tension in the tension mechanism 82 and thereby produce slack in the slat conveyor 14.

In order to remove an individual platform or "slat" 18 from the slat conveyor 14 or to remove a slat 18 housing an ejection mechanism 124 for maintenance, repair, or other reasons, the slat conveyor 14 is slackened, as described, and the slat connectors 36 connecting the subject slat 18 to adjacent slats 18 are pulled out of the corresponding connector slots 28 as shown in FIGS. 3, 4, and 5, allowing the subject slat to be removed.

In operation, the number of and location of ejection mechanisms 124 and an identification code for each ejection mechanism are input into the controller memory when movement of the slat conveyor begins. Parcels 24 are induced sequentially onto the upstream end of the slat conveyor 14 either manually or automatically by an induction conveying system as illustrated by induction conveyor 15 shown in FIGS. 1 and 2. A destination code for each parcel is entered into the controller memory using a keypad (not shown), voice recognition input device (not shown), or an optical code reader the phrase (not shown), before the parcel is placed onto the slat conveyor 14 as described above. Depending on the side of the slat conveyor 14 to which the parcel 24 is to be discharged, the PLC will cause the pusher member 130 of the ejection mechanism 124 of the slat 18 onto which the parcel 24 will be loaded to move to a left or right position by actuating the pusher member 130 via the electric gear motor 154 and screw actuator 148, as described above. The parcel 24 is then placed onto the slat conveyor 14 onto the slat 18 with the pusher member 130 poised to discharge the parcel 24 as directed by the PLC. As the parcel 24 reaches the desired output destination, such as receiving chute 16, as shown in FIG. 1, the spring loaded electrical contacts 170 attached to the electric gear motor 154 will engage the fixed power strips 176, as shown in FIGS. 2, 12 and 13. At the direction of the PLC, the electric gear motor 154 will be energized via the fixed power strips 176 and the electrical contacts 170 to rotate the screw actuator 148 and actuate the pusher member 130 to discharge the parcel 24 off the slat conveyor 14 onto the receiving chute 16.

After the parcel 24 is discharged onto the receiving chute 16, as described, the PLC may reverse the polarity of the current to the electric gear motor 154 to return the pusher member 130 to the start position, as described above, or the PLC may leave the pusher member 130 in its current position in order to discharge a parcel subsequently loaded and directed to the opposite side.

It should be understood that two or more pusher members 130 may be assigned to a single parcel 24 and that the pusher members 130 may be actuated simultaneously to such a single parcel from the slat conveyor 14. This procedure is particularly useful for heavier or longer parcels. Additionally, where two or more pusher members 130 are assigned to a single parcel, the pusher members 130 may be actuated sequentially in order to rotate a parcel so as to facilitate it's discharge onto the receiving chute 16 with a desired end of the parcel forward.

As with the first embodiment, operation of the alternate ejection mechanism 220 described in the second embodiment can be controlled by a programmable logic controller. As a parcel 24 moves adjacent to desired output discharge location, as described for the first embodiment, the sheave 250 of the ejection mechanism 220 moves into position between upper and lower drive belts 300 of the off-board drive assembly 265. The PLC causes the power source to energize the upper and lower drive motors 270 and 275, shown in FIGS. 22 and 23, and the solenoid 320 is energized to cause the separator wedge 310 to retract as shown in FIG. 22. As the separator wedge 310 retracts, the tension spring 305 pulls the upper and lower mounting plates 280 and 285 and upper and lower drive belts 300 together to engage the sheave 250 as shown in FIGS. 22 and 23. The sheave 250, thus engaged, rotates the actuator screw 148 and causes the pusher member 130 to push the parcel 24 off the conveyor belt 225 and onto a discharge area (not shown).

As the pusher member 130 traverses the conveyor belt 225 or slat 18 as described, the coil spring retractor 260 retracts the pusher member 130 back to the starting position adjacent to the sheave end of the screw actuator 148 as shown in FIG. 17.

For purposes of maintenance or removal of the ejection mechanism 220 from the conveyor belt 225 or from the slats 18, the ejection mechanism 220 may be quickly and easily removed without the use of tools. As shown in FIGS. 17 and 18, the ejection mechanism 220 may be removed from the conveyor belt 225 or from the slats 18 by removing the retainer pin 245, the spring washer 240 and the flexible insert 235, and then lifting the ejection mechanism 220 off the conveyor belt 225 or slat 18.

While the present invention in its various aspects has been described in detail with regard to preferred embodiments thereof, it should be understood that variations, modifications and enhancements can be made to the disclosed apparatus and procedures without departing from the spirit and scope of the present invention as defined in the appended claims.

What is claimed is:

1. A conveyor apparatus defining at least one package supporting surface for conveying a package placed thereon along a conveying path from a first to a second location, said apparatus comprising:
    a stationary frame;
    a package conveying portion movable along said conveying path relative to said frame, said package conveying portion defining said supporting surface and including a moving lateral force support member moving with said package conveying portion and being fixed relative to said supporting surface;
    a pusher member for pushing said package laterally from said conveying path and off of said supporting surface;
    an electric motor attached relative to and moving along as a whole with said supporting surface for providing energy to urge said pusher member such that it pushes said package across and off of said supporting surface; and
    a lead screw intermediate said electric motor and said pusher member for providing a force transfer means intermediate said motor and said pusher member.

2. The conveyor apparatus of claim 1, further comprising a polarity reverser to reverse the polarity of current to said motor so as to drive said lead screw in two directions.

* * * * *

UNITED STATES PATENT AND TRADEMARK OFFICE
CERTIFICATE OF CORRECTION

PATENT NO. : 6,543,602 B1
DATED : April 8, 2003
INVENTOR(S) : Bonnet

It is certified that error appears in the above-identified patent and that said Letters Patent is hereby corrected as shown below:

Column 11,
Line 14, after "or" insert -- for --;
Line 30, cancel "the phrase".

Signed and Sealed this

Second Day of September, 2003

JAMES E. ROGAN
*Director of the United States Patent and Trademark Office*